Patented May 4, 1954

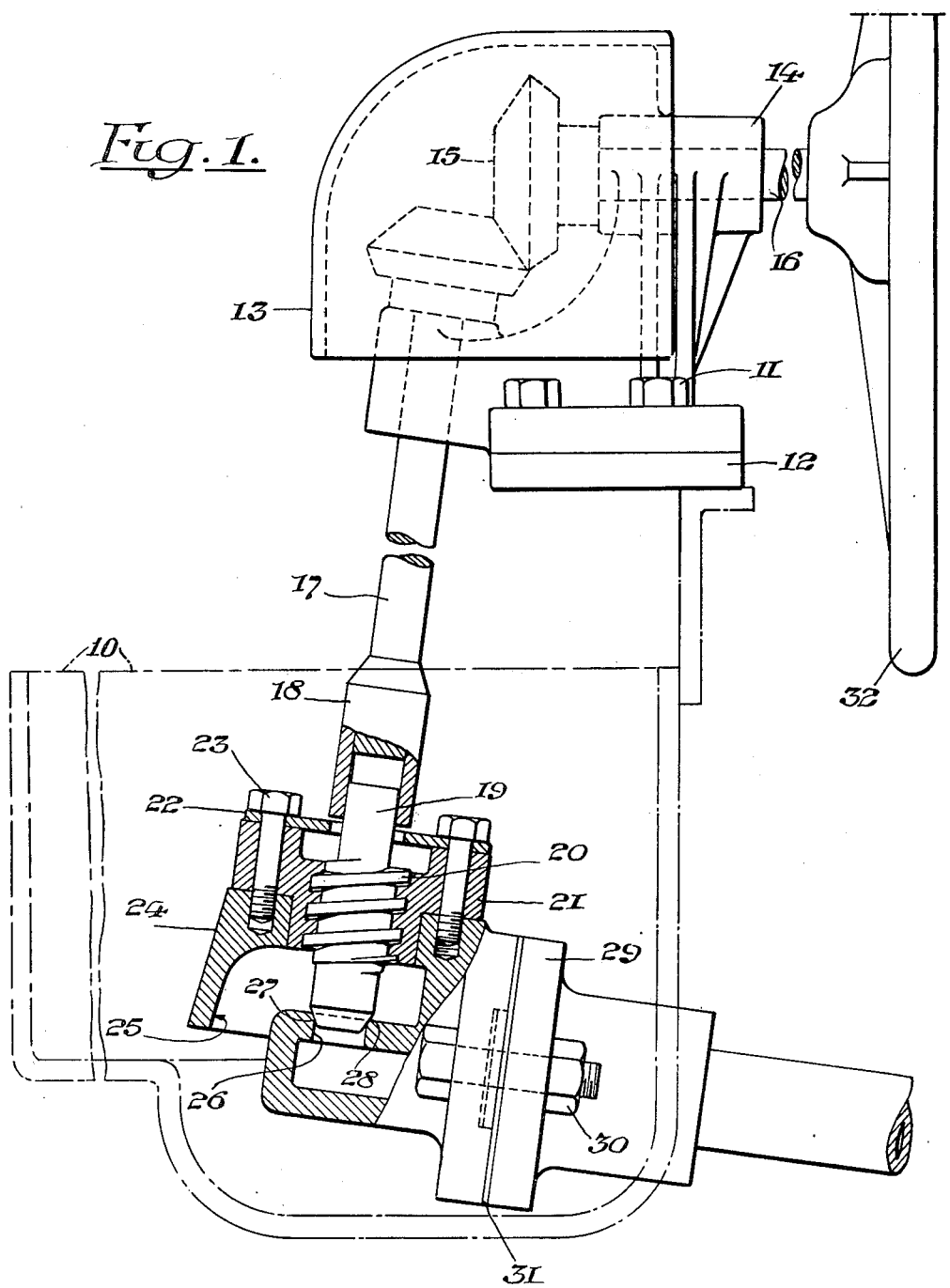

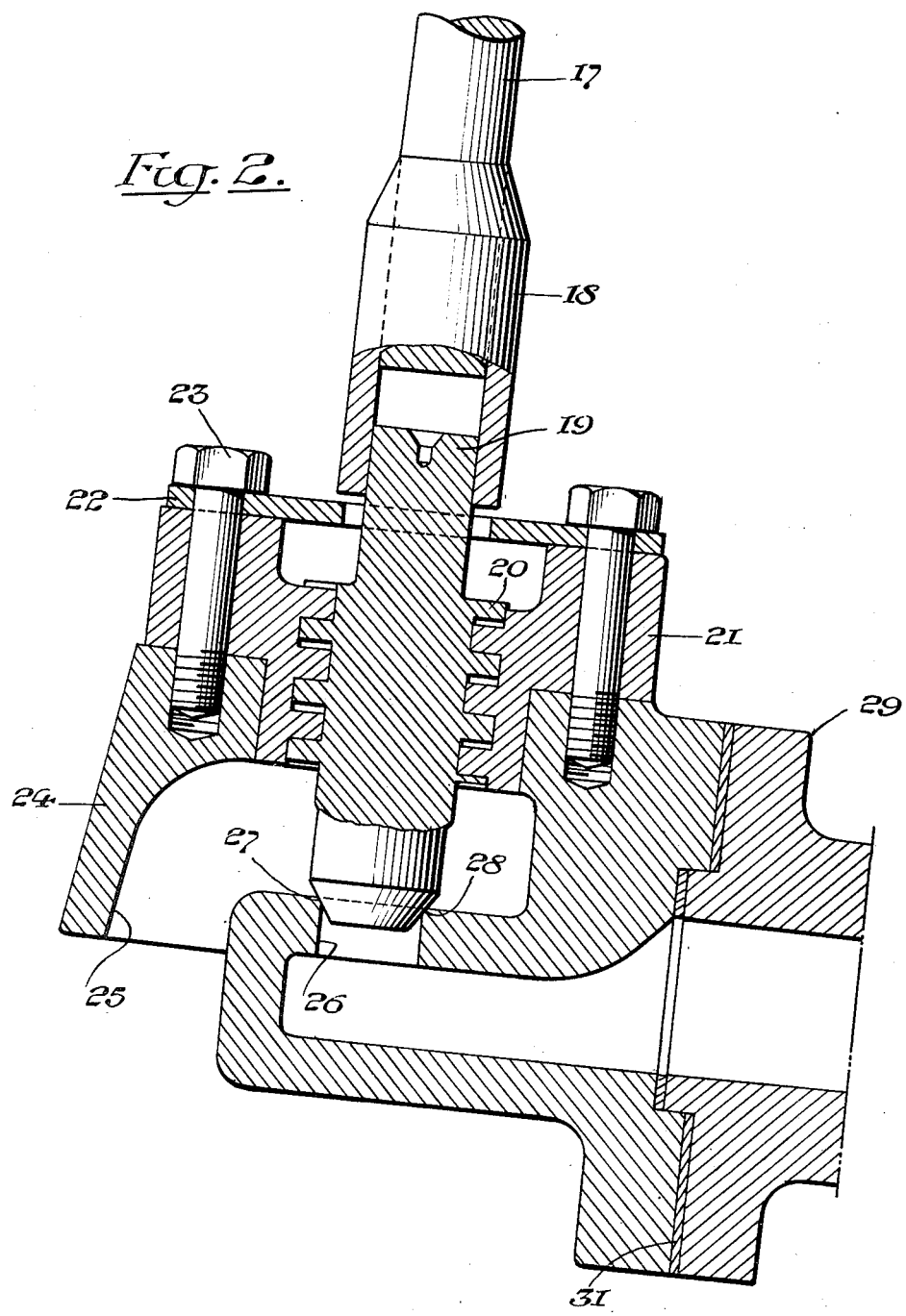

2,677,161

UNITED STATES PATENT OFFICE 2,677,161

MELTING POT VALVE ASSEMBLY

Albert H. Jung, Flushing, N. Y., assignor to United American Metals Corporation, Brooklyn, N. Y., a corporation of New York Application January 5, 1950, Serial No. 136,990

1 Claim. (Cl. 22—79)

This invention relates to valves for use in delivering molten metal from the bottom of melting pots.

Presently known valves used in conjunction with metal melting pots have developed leaks shortly after being put into use. These leaks result from the presence of metal which flows into the valve mechanism and solidifies therein, during periods of cooling when the melting pot is not in use. Where the valve seat is rigidly secured to the wall of the melting pot, the unequal expansion during heating or cooling cycles also results in the distortion of valve seats with a consequent failure of the said valve.

Accordingly, it is an object of this invention to provide a valve for use in melting pots, which will remain operative despite repeated cycles of heating and cooling.

Another object of this invention is to provide a valve which will function although immersed in molten metal.

A further object of this invention is to provide a simplified valve for use in metal melting pots.

A feature of this invention is its novel thread structure.

A further feature of this invention is its floating construction which prevents valve injury resulting from the expansion and contraction of the melting pot.

The invention consists of the construction, combination and arrangement of parts, as herein illustrated, described and claimed.

In the accompanying drawings, forming a part hereof, is illustrated one form of embodiment of the invention, in which drawings similar reference characters designate corresponding parts, and in which:

Figure 1 is a view in side elevation of the complete valve assembly, according to this invention, with a portion thereof cut away to show its construction.

Figure 2 is a vertical section of the valve member shown in Figure 1, somewhat enlarged.

Referring to the drawings, 10 indicates the wall of a melting pot, such as is used for melting metal, to the top of which is secured, as by bolts 11, a bracket 12. The bracket 12 supports a housing 13 through the front of which a bearing member 14 projects.

The bearing member 14 is adapted to carry therein a pair of beveled gears 15 so arranged that torque applied to the shaft 16 is translated by the said beveled gears 15 to a substantially vertical rod 17. The rod 17 comprises a valve stem extension and is provided with a valve stem receiving socket 18 at the lower end thereof. The valve stem 19 which is received by the socket 18 is provided with threads 20 which are receivable within an internally threaded bonnet 21 which comprises the valve body. A valve stop plate 22 is secured to the top of the bonnet 21 by studs 23, which pass through the bores in the said stop plate and engage the valve housing 24. The valve housing 24 is provided with an intake aperture 25 at the bottom thereof, and a discharge port 26 through which the metal can pass. The discharge port 26 also carries the valve seat 27, to receive the bevel 28, which is integral with the lower portion of the valve stem 19.

The valve housing 24 is secured to a coupling 29, by means of bolts 30, and a gasket 31 is interposed between the valve housing 24 and the coupling 29, in the well known manner. The coupling 29 is secured to the wall 10 of the melting pot, as by welding, in such a manner that the entire valve and coupling assembly is free from contact with the bottom of the melting pot. This construction is hereinafter referred to as a free floating valve.

The thread 20 carried by the stem 19 is machined so that a suitable clearance is provided between the male and female threads of the valve, as shown in Figure 2. When the valve is opened and the melting pot filled with molten metal, so that the said metal covers the valve, a certain quantity of the said molten metal will find its way up into the clearance between the thread members. This molten metal will not interfere with the operation of the valve, while metal is being discharged from the melting pot. When the valve is closed, as may be accomplished by turning the handle 32, molten metal which has seeped in between the threads will be squeezed from beneath the threads and valve members.

The freely floating construction of the valve prevents damage to the said structure, brought about by the unequal contraction and expansion of the bottom of the melting pot and the metal contained therein, during periods of heating or cooling. The clearance provided in the thread members further eliminates the difficulty of presently known valve structures, whereby the penetration of the molten metal renders said valves inoperative. It will thus be seen that the present invention has provided a simple, yet highly efficient valve structure, which will remain operative, despite repeated heating and cooling cycles, and will provide a tight closure of the said valve over periods of continued use.

Having thus fully described the invention, what is claimed as new and desired to be secured by Letters Patent of the United States, is:

A valve assembly for use while submerged in the metal within melting pots comprising, a melting pot, a valve housing in said pot, said housing having an intake and discharge port therein, a bonnet carried upon and secured to the housing, said bonnet being internally threaded, a valve stem receivable within the bonnet, threads carried upon the valve stem in threaded engagement with those of the bonnet, said valve stem threads having a greater space between the helix thereof than the threads of the bonnet, a valve seat carried within the valve housing in register with the end of the valve stem, support means consisting of a coupling secured to the valve housing and the wall of the pot adapted to maintain the said housing in a position above the bottom of the melting pot and means to rotate the valve stem to operate the valve and take up the axial play between the threads in the direction of stem travel.

References Cited in the file of this patent

UNITED STATES PATENTS

| Number | Name | Date |
|---|---|---|
| 258,019 | Christ | May 16, 1882 |
| 867,605 | Rothe | Oct. 8, 1907 |
| 1,487,646 | Eustis | Mar. 18, 1924 |
| 1,527,442 | Rudolph | Feb. 24, 1925 |
| 1,670,241 | Connor | May 15, 1928 |
| 1,972,709 | Jacobson | Sept. 4, 1934 |
| 1,975,184 | Thomson | Oct. 2, 1934 |
| 2,030,332 | Spear | Feb. 11, 1936 |
| 2,048,864 | Heineman | July 28, 1936 |
| 2,263,880 | Jung | Nov. 25, 1941 |

FOREIGN PATENTS

| Number | Country | Date |
|---|---|---|
| 4,563 | Great Britain | Mar. 23, 1945 |